US008208369B2

(12) United States Patent
Wu

(10) Patent No.: US 8,208,369 B2
(45) Date of Patent: Jun. 26, 2012

(54) ETHERNET RING SYSTEM AND A MASTER NODE AND AN INITIALIZATION METHOD THEREOF

(75) Inventor: Shaoyong Wu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 142 days.

(21) Appl. No.: 12/680,187

(22) PCT Filed: Dec. 26, 2007

(86) PCT No.: PCT/CN2007/003812

§ 371 (c)(1), (2), (4) Date: May 25, 2010

(87) PCT Pub. No.: WO2009/039698

PCT Pub. Date: Apr. 2, 2009

(65) Prior Publication Data

US 2010/0260040 A1 Oct. 14, 2010

(30) Foreign Application Priority Data

Sep. 25, 2007 (CN) .......................... 2007 1 0151870

(51) Int. Cl.

| | |
|---|---|
| ***G01R 31/08*** | (2006.01) |
| ***G01F 11/00*** | (2006.01) |
| ***G08C 15/00*** | (2006.01) |
| ***H04J 1/16*** | (2006.01) |
| ***H04J 3/14*** | (2006.01) |
| ***H04L 1/00*** | (2006.01) |
| ***H04L 12/26*** | (2006.01) |

(52) U.S. Cl. ........................................ 370/216; 370/235

(58) Field of Classification Search ........................ None
See application file for complete search history.

(56) References Cited

U.S. PATENT DOCUMENTS

2003/0154285 A1* 8/2003 Berglund et al. ............. 709/227
2004/0223503 A1* 11/2004 Lynch et al. .................. 370/404

FOREIGN PATENT DOCUMENTS

CN 1791049 A 6/2006
CN 1812361 A 8/2006
CN 1909496 A 7/2007

OTHER PUBLICATIONS

International Search Report for patent application No. PCT/CN2007/003812 dated Jul. 3, 2008.

* cited by examiner

*Primary Examiner* — Xavier Szewai Wong

(57) ABSTRACT

The present invention provides an Ethernet ring system and the master node and the initialization method thereof, comprising the following steps: Step 1, a master node of an Ethernet ring protection domain is generated from nodes on a ring; Step 2, the master node detects the link state of a primary port and a secondary port wherein if the master node detects that no fault occurs in the link of the primary port and the secondary port, it records the state of the ring network as the initializing state and blocks the secondary port; Step 3, the master node sends a link health check message to the ring network periodically; Step 4, it is judged whether the master node receives the link health check message in a prescribed time period wherein if receiving the message, it records the state of the ring network as intact, continues blocking the secondary port and sends a ring network restoration notification message to the ring network, informing other nodes that the state of the ring network is intact, so as to realize the initialization of the master node.

6 Claims, 3 Drawing Sheets

S301 a master node of an Ethernet ring is generated from nodes in a ring
S302 the master node detects the link state of the ports in the ring
Whether a fault occurs in the link
Y
N
S304 blocking the secondary port, recording the state of the ring as INIT and periodically sending a HELLO message out
S303 blocking the port where the fault occurs, recording the state of the ring as DOWN and informing other nodes that the state of the ring is DOWN
The master node receives the HELLO message in a prescribed time period, does not receive a LINK-DOWN message and does not detect a fault occurs in the link of the ports in the ring
N
Y
S306 recording the state of the ring as DOWN, wherein if no fault occurs in the secondary port, it unblocks the secondary port and informs other nodes that the state of the ring network is DOWN
S305 recording the state of the ring as UP, blocking the secondary port and informing other nodes that the state of the ring network is UP
S307 the master node enters the correct state of the ring network

ETHERNET RING SYSTEM AND A MASTER NODE AND AN INITIALIZATION METHOD THEREOF

CROSS REFERENCE TO RELATED APPLICATIONS OR PRIORITY CLAIM

This application is a national stage application under 35 U.S.C. §371 from PCT Application No. PCT/CN2007/003812, filed Dec. 26, 2007, which claims the priority benefit of Chinese Application No. 200710151870.9, filed Sep. 25, 2007.

FIELD OF THE INVENTION

The present invention relates to the field of Ethernet ring automatic protection technology, and more specifically relates to an Ethernet ring automatic protection system and a master node and an initialization method thereof.

BACKGROUND OF THE INVENTION

In an Ethernet ring protection system of RFC 3619, a plurality of nodes is connected to form a ring on which a plurality of Ethernet ring protection domains can be defined. In a domain it is comprised a master node, several transmit nodes and a set of protected service Virtual Local Area Networks (VLANs) for forwarding user data, wherein two ports of the master node on the ring are respectively defined as a primary port and a secondary port, and the protected service VLAN are defined as the protection service VLAN. When the link on the ring is intact, the master node blocks the forwarding function of the protection service VLAN of the secondary port and no loop is produced in the network, which avoids the "broadcast storm" caused by a loop in the network. When a fault occurs on a link in the ring, the master node unblocks the forwarding function of the protection service VLAN of the secondary port and user data can pass through the secondary port of the master node to guarantee the connectivity of services. An Ethernet ring protection control message is the communication and control message between nodes in a domain. When the node blocks the port, the Ethernet ring control message can still pass through without being affected. In the normal operation of the Ethernet ring protection system, each node on the ring records the current state of the Ethernet ring as intact (UP) or faulted (DOWN).

In the prior art, the Ethernet ring automatic protection system in the normal operation, as shown in FIG. 1, is composed of nodes S1, S2, S3 and S4. On the ring formed by these four nodes an Ethernet ring protection domain is configured, in which the master node is S2 (MASTER) and other nodes S1, S3 and S4 are transit nodes (TRANSIT). The two in-ring ports of the master node S2 are respectively a primary port and a secondary port, wherein the port 2 is the primary port (P) and the port 1 is the secondary port (S). Additionally, a protection service VLAN, in which each port on the ring is configured, are also defined in the domain. When the link on the ring is intact, the master node S2 blocks the data forwarding function of the protection service VLAN of the secondary port 1 and prevents a loop from being formed in the network, to avoid the "broadcast storm". When the link on the ring has malfunction, the master node S2 unblocks the data forwarding function of the protection service VLAN of the secondary port 1 to make the data in the service VLAN to be reconnected again.

The master node sends a ring network link health-check message (HELLO) to the primary port periodically. When the link on the ring is intact, the Hello message passes through each transit node successively and reaches the secondary port of the master node. The Hello message can be received by the master node through the secondary port blocked. If the master node fails to receive the HELLO message in a prescribed time period, it is considered that a fault occurs in the link on the ring.

When detecting a fault occurring on an adjacent link, a transit node sends a link fault alert message (LINK-DOWN), which is transmitted through the link on the ring and reaches the master node. If the secondary port of the master node is blocked, the LINK-DOWN message also passes through the secondary port of the master node and reaches the master node. When the master node receives the LINK-DOWN message at the primary or secondary port, it is considered that a fault occurs on the link in the ring.

When detecting a fault occurring on the link in the ring, the master node records the state of the ring network as DOWN, unblocks the forwarding function of the protection service VLAN of the secondary port, updates a Media Access Control (MAC) address table of the port on the ring and sends a ring network fault notification message (FLUSH-DOWN), informing other nodes on the ring to perform a link fault switching. After receiving the FLUSH-DOWN, a transit node records the state of the ring network as DOWN, updates a MAC address table of the port on the ring, and the data in the protection service VLAN begin to be transmitted through a new path.

When detecting a fault occurring on an adjacent link, the node blocks the forwarding function of the protection service VLAN of the corresponding port. When the fault disappears, it does not unblock the forwarding function of the protection service VLAN of the port immediately and moves into a PREFORWARD state. During the LINK-DOWN period, the master node still sends the HELLO message out from the primary port. If the fault in the link disappears, the HELLO message can pass through the blocked port and the link with the fault having disappeared. If the HELLO message is received at the secondary port, it is considered that the link on the ring is restored, and the mast node records the state of the ring network as UP, blocks again the forwarding function of the protection service VLAN of the secondary port, updates the MAC address table of the port on the ring and sends a ring network restoration notification message (FLUSH-UP) to the ring, informing other nodes on the ring to perform a link restoration switching. After receiving the FLUSH-UP, a transit node records the state of the ring network as UP, updates the MAC address table of the port on the ring, unblocks the forwarding function of the protection service VLAN of the port in the PREFORWARD state, and the data in the protection service VLAN begin to be transmitted through a new path.

When configuring the Ethernet ring protection domain, the master node does not know, at the initialization stage, whether the current state of the ring network is UP or DOWN and therefore can not enter a correct state. As shown in FIG. 2, the state of the ring network is UP, the nodes S1, S3 and S4 have already been configured as transit nodes of the ring network protection domain. After being configured as the master node, the node S2 begins initializing, however, the node S2 does not know the current state of the ring network. If the node S2 sets the state of the ring network as DOWN and unblocks the secondary port 1 and the primary port 2, a loop will be formed in the whole ring network after the master node is configured and the "broadcast storm" will exist continuously.

SUMMARY OF THE INVENTION

The main object of the present invention is to provide an Ethernet ring system and the master node and the initialization method thereof, in order to avoid that the master node in the Ethernet ring domain enters a wrong state during initialization and avoid the Ethernet ring protection from operating mistakenly, and in order to enhance the anti-fault ability of the Ethernet ring in the practical networking.

To achieve the above object, in the present invention, the state of the ring network, which is recorded when the master node of the Ethernet ring does not know the real state during initialization, is defined as the initializing state (INIT). After the master node detects the real state of the ring network, it enters the correct state of the network from the INIT state. During initialization, the node blocks the function of the protection service VLAN of a port on the ring, to avoid a loop.

The present invention provides an initialization method for a master node of an Ethernet ring system, comprising the following steps: Step 1, a master node of an Ethernet ring protection domain is generated from nodes on a ring; Step 2, the master node detects the link state of a primary port and a secondary port wherein if the master node detects that no fault occurs in the link of both of the primary port and the secondary port, it records the state of the ring network as the initializing state and blocks the secondary port; Step 3, the master node sends a link health check message to the ring network periodically; Step 4, it is judged whether the master node receives the link health check message in a prescribed time period wherein if receiving the message, the master node records the state of the ring network as intact, continues blocking the secondary port and sends a ring network restoration notification message to the ring network, informing other nodes that the state of the ring network is intact, so as to realize the initialization of the master node.

In the Step 2, if the master node detects a link fault occurs in the primary port and/or the secondary port, it blocks the port where the fault occurs, marks the state of the ring network as fault, sends a ring network fault notification message, informing other transit nodes that the state of the ring network is fault, so as to realize the initialization of the master node.

In the Step 4, if the master node does not receive the link health check message, the master node records the state of the ring network as fault, unblocks the blocked secondary port, sends a ring network fault notification message to the ring network, informing other transit nodes that the state of the ring network is fault, so as to realize the initialization of the master node.

In the Step 4, the criteria of judging the state of the ring network is faulted also comprises that the master node receives a link fault alert message sent by a transit node or detects a link fault corresponding to the port in the ring network.

The present invention also provides an Ethernet ring system, comprising nodes on a ring configured to generate a master node of an Ethernet ring protection domain, wherein the master node includes a detecting module configured to detect the link state of a primary port and a secondary port; a recording module configured to record the state of the ring network as the initializing state and block the secondary port if no fault is detected in the link of the primary port and the secondary port; a sending module configured to send a link health check message to the ring network periodically; a checking and receiving module configured to check and receive the link health check message in a prescribed time period; and a notifying module configured to record the state of the ring network as intact if yes, continue blocking the secondary port and send a ring network restoration notification message to the ring network, informing other nodes that the state of the ring network is intact.

The present invention also provides a master node which is a node on a ring of an Ethernet ring system protection domain, including a detecting module configured to detect the link states of a primary port and a secondary port; a recording module configured to record the state of the ring network as the initializing state and block the secondary port if no fault is detected in the link of the primary port and the secondary port; a sending module configured to send a link health check message to the ring network periodically; a checking and receiving module configured to check and receive the link health check message in a prescribed time period; and a notifying module configured to record the state of the ring network as intact if yes, continue blocking the secondary port and send a ring network restoration notification message to the ring network, informing other nodes that the state of the ring network is intact.

In the Ethernet ring system and the master node and the initialization method thereof provided in the present invention, during the initialization of the master node, the master node blocks the port to avoid the occurrence of a loop, detects the real state of the ring network, and quickly enters the correct state of the ring network and a protocol computing process, which avoids a loop or an open link caused by the master node without knowing the real state of the ring network during the initialization and increases the anti-fault ability of the ring network protection system.

BRIEF DESCRIPTION OF THE DRAWINGS

The figures illustrated here provide a further understanding of the present invention and constitute a part of the present application. The schematic embodiments and explanations thereof serve to explain the present invention and are not intended to limit it, in which.

DETAILED DESCRIPTION

The embodiments of the present invention will be illustrated in detail with reference to the accompanying drawings.

The initialization method of the master node of the Ethernet ring system in the present invention comprises the following steps:

Step 301, a master node of an Ethernet ring protection domain is generated from the nodes in a ring network.

Step 302, the master node detects the link state of a primary port and a secondary port.

Step 303, if a fault occurs at the primary port and/or the secondary port of the master node, the master node blocks the port where the fault occurs, considers the state of the ring network as DOWN and sends a FLUSH-DOWN message out, informing other transit nodes that the state of the ring network is DOWN.

Step 304, if no fault occurs at any port in the ring, the master code blocks the secondary port, records the state of the ring network as INIT and periodically sends a HELLO message out.

Step 305, if receiving the sent HELLO message in a prescribed time period, the master node marks the state of the ring network as UP, continues blocking the secondary port and sends a FLUSH-UP message out, informing other transmit nodes that the state of the ring network is UP.

Step 306, if not receiving the HELLO message in the prescribed time period, or receiving a LINK-DOWN message or detecting a fault occurring in the link corresponding to the port on the ring, the master node considers the state of the ring network as DOWN, unblocks the secondary port and sends a FLUSH-DOWN message to the ring, informing other transit nodes that the state of the ring network is DOWN.

Step 307, the master node enters the correct state of the ring network.

The master node in the Ethernet ring has no loop occurring during the initialization and quickly enters the correct state of the ring network, which effectively avoids the master node during initialization from mistakenly judging the state of the ring network and increases the stability of the Ethernet ring protection system.

Figure 1:
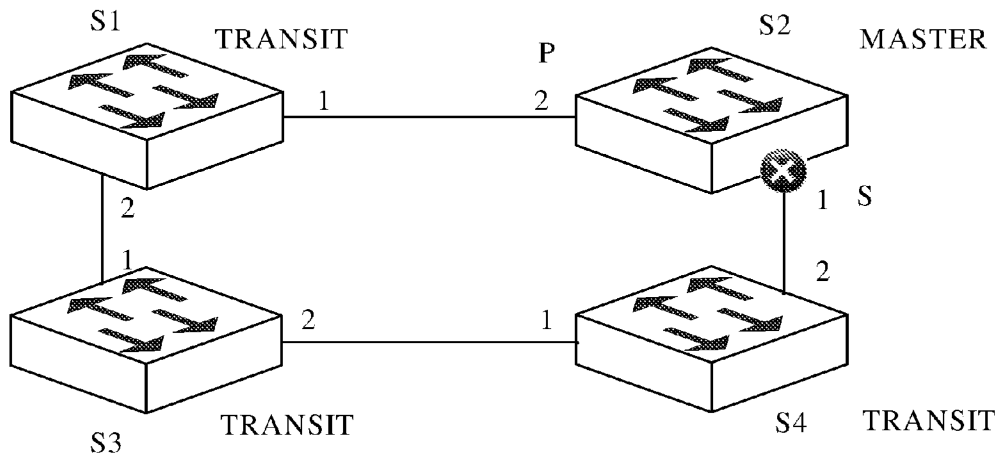
FIG. 1 is a schematic view of an Ethernet ring protection system in the prior art.
Figure 2:
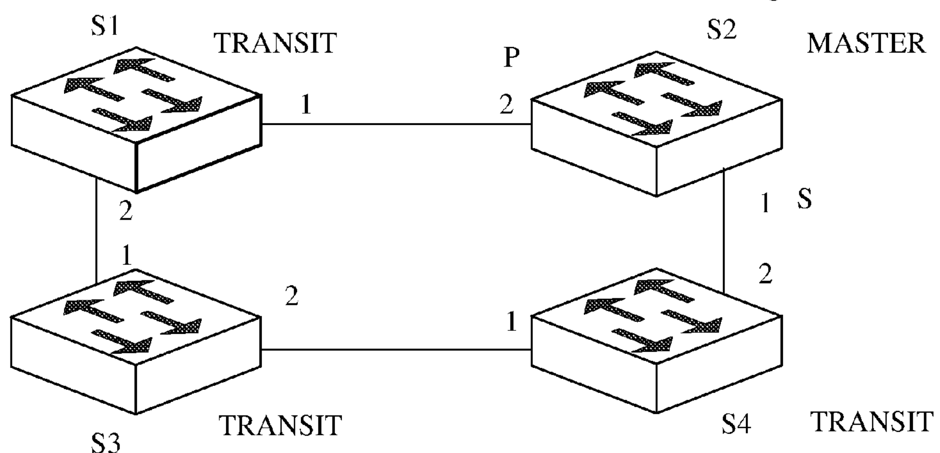
FIG. 2 is a schematic view of an Ethernet ring protection system in the prior art wherein a fault occurs during the initialization of the master node.
Figure 3:
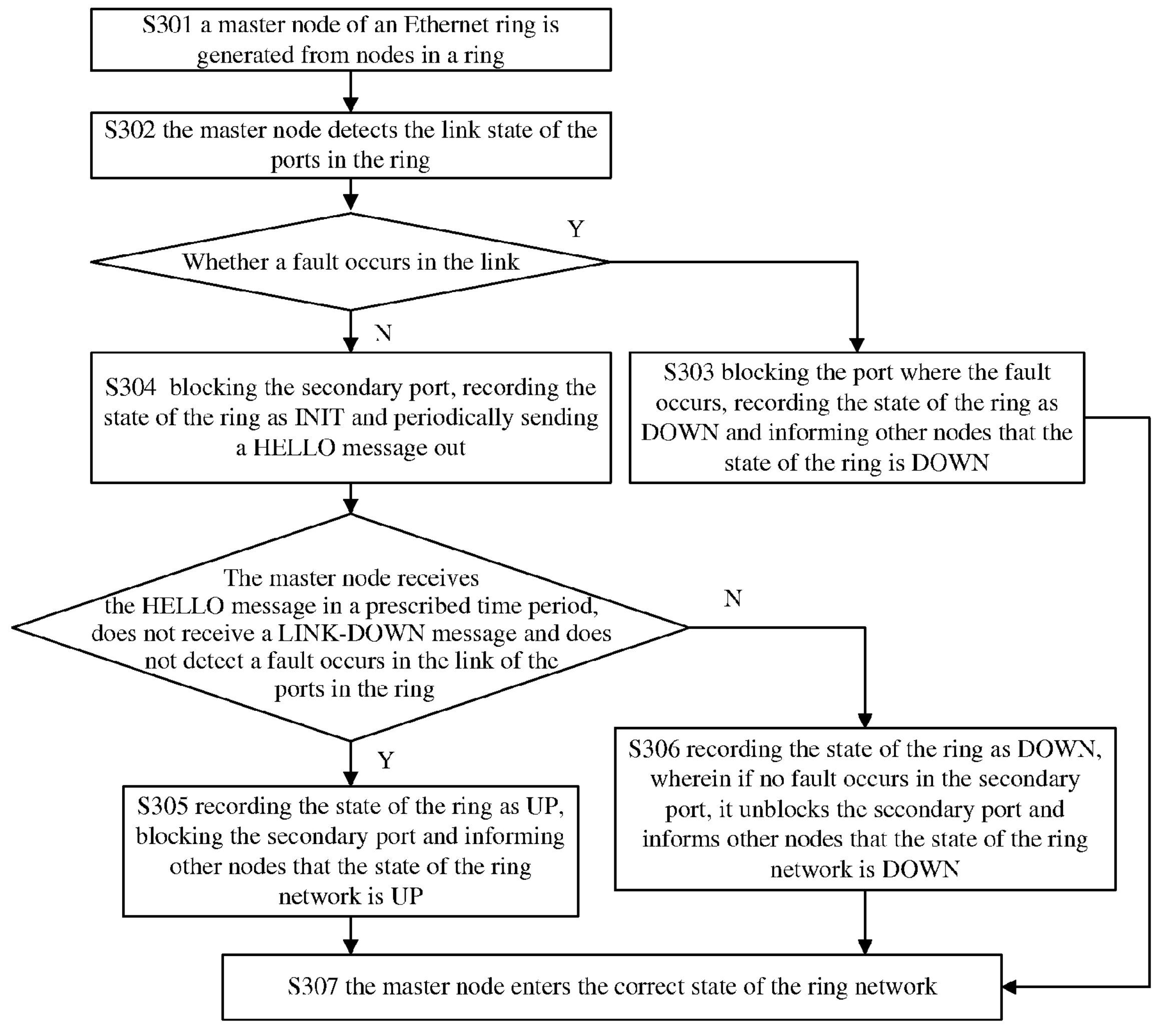
FIG. 3 is a flow chart of the initialization method of the master node of an Ethernet ring system of the present invention.
Figure 4:
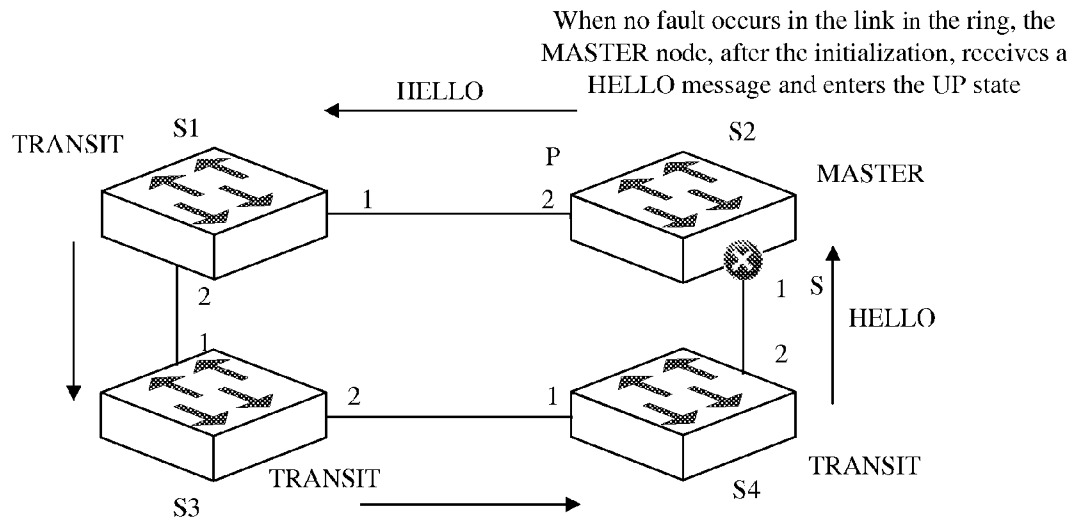
FIG. 4 a schematic view of the first embodiment of the present invention wherein no fault occurs in the link of the ring network.

In one embodiment of the present invention, as shown in FIG. 4, there are three transit nodes and one master node in the ring, the links in the ring are intact, all transit nodes have been configured and the configured master node begins initializing. The master node blocks the secondary port during the initialization to avoid the occurrence of the loop in the network, records the state of the ring network as INIT and sends a HELLO message to the ring. The links in the ring are intact, and the HELLO message reaches the master node after passing through each transit node. After receiving the HELLO message, the master node considers the state of the ring network as UP, continues blocking the secondary port and informs other nodes that the state of the ring is UP. The master node enters the correct state of the ring network from the INIT state and no loop occurs during the initialization.

Figure 5:
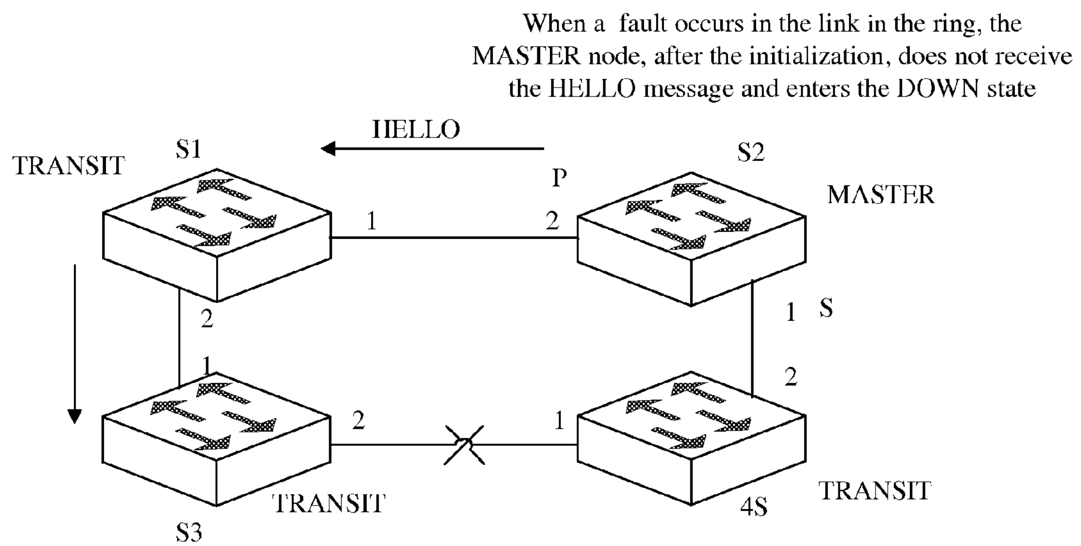
FIG. 5 a schematic view of the first embodiment of the present invention wherein a fault occurs in the link of the ring network.

In another embodiment of the present invention, as shown in FIG. 5, there are three transit nodes and one master node in the ring, a fault occurs on the link between two transit nodes in the ring, all transit nodes have been configured and the configured master node begins initializing. The master node blocks the secondary port during the initialization, records the state of the ring network as INIT, and sends a HELLO message to the ring. As the HELLO message can not pass through the faulted link to reach the master node, the master node can not receive the HELLO message in the prescribed time period. The master node considers the state of the ring network as DOWN, unblocks the secondary port and informs other nodes that the state of the ring is DOWN. The master node enters the correct state of the ring network from the INIT state. After the initialization, the normal communication can be performed between the two nodes in the ring.

Additionally, according to the embodiment of the present invention, it is provided an Ethernet ring system, comprising nodes in a ring configured to generate a master node of an Ethernet ring protection domain, wherein the master node includes a detecting module configured to detect the link state of a primary port and a secondary port; a recording module configured to record the state of the ring network as the initializing state and blocking the secondary port if no fault is detected on the link of both the primary port and the secondary port; a sending module configured to send a link health check message to the ring network periodically; a checking and receiving module configured to check and receive the link health check message in a prescribed time period; and a notifying module configured to, if yes, record the state of the ring network as intact if yes, continue blocking the secondary port and send a ring network restoration notification message to the ring network, informing other nodes that the state of the ring network is intact.

According to the embodiment of the present invention, it is also provided a master node which is a node in a ring of an Ethernet ring system protection domain, including a detecting module configured to detect the link state of a primary port and a secondary port; a recording module configured to record the state of the ring network as the initializing state and blocking the secondary port if no fault is detected on the link of the primary port and the secondary port; a sending module configured to send a link health check message to the ring network periodically; a checking and receiving module configured to check and receiving the link health check message in a prescribed time period; and a notifying module configured to, if yes, record the state of the ring network as intact if yes, continue blocking the secondary port and sending a ring network restoration notification message to the ring network, informing other nodes that the state of the ring network is intact.

The present invention provides an Ethernet ring system and the master node and the initialization method thereof, defining the initializing state of the master node, wherein the master node blocks a port during the initialization to avoid a loop and enters the correct state of the ring network after detecting the ring network, which avoids the faults caused by the master node mistakenly judging the state of the ring network during the initialization, and increases the reliability and stability of the system. The present invention can be applied in various Ethernet ring protection technologies.

The present invention has been shown with reference to the above-described preferable embodiments, and it is not to be limited by the above embodiments. It is understood by those skilled in the art that various alterations and changes may be made to the present invention. Within the spirit and scope of the invention, all the modifications, substitute equivalents or improvements made are intended to be embraced in the claims of this invention.

The invention claimed is:

1. An Ethernet ring system, comprising:

nodes on a ring, configured to generate a master node of an Ethernet ring protection domain, wherein the master node includes:

a detecting module configured to detect the link state of a primary port and a secondary port;

a recording module configured to record the state of the ring network as the initializing state and to block the secondary port if no fault is detected on the link of the primary port and the secondary port;

a sending module configured to send a link health check message to the ring network periodically;

a checking and receiving module configured to check and receive the link health check message in a prescribed time period; and a notifying module configured to, if yes, record the state of the ring network as intact, to continue blocking the secondary port and to send a ring network restoration notification message to the ring network, informing other nodes that the state of the ring network is intact.

2. A master node, which is a node in a ring of an Ethernet ring system protection domain, comprising:

a detecting module configured to detect the link state of a primary port and a secondary port;

a recording module configured to record the state of the ring network as the initializing state and to block the secondary port if no fault is detected in the link of the primary port and the secondary port;

a sending module configured to send a link health check message to the ring network periodically;

a checking and receiving module configured to check and receive the link health check message in a prescribed time period; and a notifying module configured to, if yes, record the state of the ring network as intact, to continue blocking the secondary port and to send a ring network restoration notification message to the ring network, informing other nodes that the state of the ring network is intact.

3. An initialization method for a master node of an Ethernet ring system, comprising the following steps:

Step 1, a master node of an Ethernet ring protection domain being generated from nodes on a ring;

Step 2, the master node detecting the link state of a primary port and a secondary port, wherein if the master node detects that no fault occurs on the link of the primary port and the secondary port, the master node records the state of the ring network as the initializing state and blocks the secondary port;

Step 3, the master node sending a link health check message to the ring network periodically; and Step 4, judging whether the master node receives the link health check message in a prescribed time period, wherein if yes, recording the state of the ring network as intact, continuing blocking the secondary port and sending a ring network restoration notification message to the ring network to inform other nodes that the state of the ring network is intact, so as to realize the initialization of the master node.

4. The initialization method for a master node of an Ethernet ring system according to claim 3, wherein in the Step 2, if the master node detects a link fault occurring at the primary port and/or the secondary port, the master node blocks the port where the link fault occurs, marks the state of the ring network as fault, sends a ring network fault notification message, informing other transit nodes that the state of the ring network is fault, so as to realize the initialization of the master node.

5. The initialization method for a master node of an Ethernet ring system according to claim 3, wherein in the Step 4, if the master node does not receive the link health check message, the master node records the state of the ring network as fault, unblocks the blocked secondary port, sends a ring network fault notification message to the ring network, informing other transit nodes that the state of the ring network is fault, so as to realize the initialization of the master node.

6. The initialization method for a master node of an Ethernet ring system according to claim 5, wherein in the Step 4, the criteria of determining the state of the ring network is fault further comprises that the master node receives a link fault alert message sent by the transit nodes or detects a link fault corresponding to the port of the ring network.

* * * * *